Oct. 20, 1953  A. C. JOHNSON  2,656,131
DISPENSING CONTAINER FOR FISHING LEADERS
Filed June 13, 1947  2 Sheets-Sheet 1
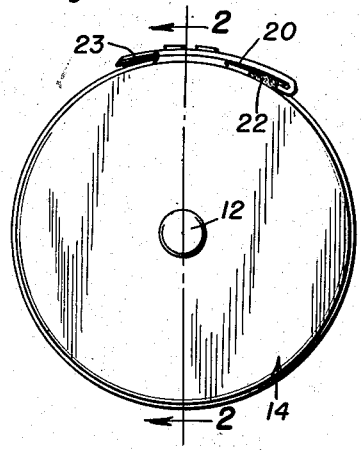
Fig. 1.
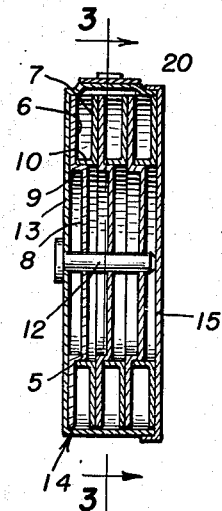
Fig. 2.
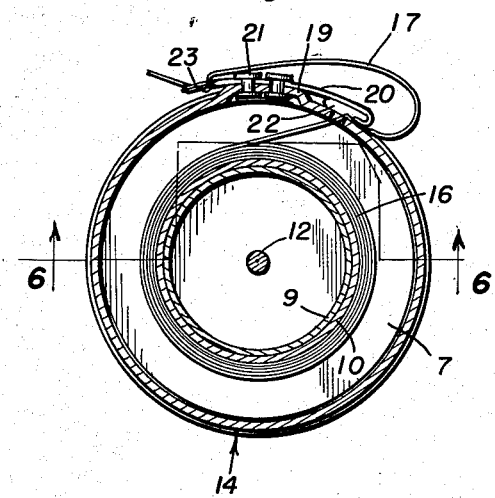
Fig. 3.
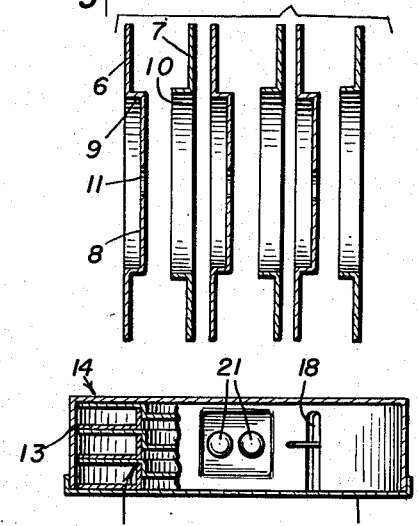
Fig. 5.
Fig. 6.
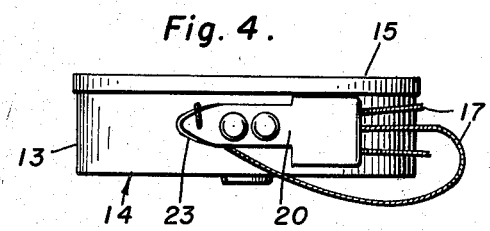
Fig. 4.
*Inventor*
Arthur Carl Johnson
By *Clarence A. O'Brien
and Harvey B. Jacobson*
*Attorneys*

Oct. 20, 1953  A. C. JOHNSON  2,656,131
DISPENSING CONTAINER FOR FISHING LEADERS
Filed June 13, 1947  2 Sheets-Sheet 2

Inventor
Arthur Carl Johnson

By *Clarence A. O'Brien
and Harvey B. Jacobson*
Attorneys

Patented Oct. 20, 1953

2,656,131

UNITED STATES PATENT OFFICE 2,656,131

DISPENSING CONTAINER FOR FISHING LEADERS

Arthur Carl Johnson, Breedsville, Mich.

Application June 13, 1947, Serial No. 754,396

1 Claim. (Cl. 242—135)

The present invention relates to new and useful improvements in dispensing containers, and more particularly to a dispensing container for fishing leaders or similar coils of material.

An important object of the present invention is to provide a container in which one or more coils of fishing leaders may be mounted on individual reels and a selected leader unwound from a reel and a portion severed therefrom for use when desired, together with means for holding the unused portion of the coil in position for subsequent dispensing thereof and against becoming tangled in the container.

A further object of the invention is to provide a dispensing container for coiled material composed of a plurality of knock-down reels to facilitate the assembly of the reels in a container and to reduce the cost of manufacture thereof.

A still further object is to provide a device of this character of simple and practical construction, which is neat and attractive in appearance, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view illustrating one embodiment of the invention;

Figure 2 is a transverse sectional view taken on a line 2—2 of Figure 1;

Figure 3 is a circumferential sectional view taken on a line 3—3 of Figure 2;

Figure 4 is a side elevational view showing the combined cutter and gripping device for the end of the coil;

Figure 5 is a transverse sectional view of a group of knockdown reels;

Figure 6 is a transverse sectional view taken on a line 6—6 of Figure 3;

Figure 7:
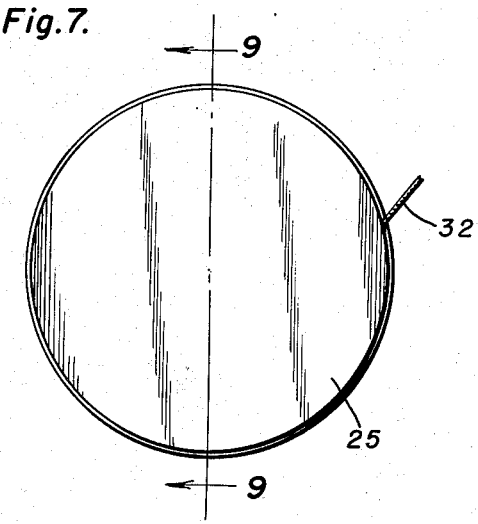
Figure 7 is a side elevational view of a modified construction.

Referring now to the drawings in detail, and first with respect to the form of the invention illustrated in Figures 1 to 6, inclusive, the numeral 5 designates a reel comprising opposed flanges 6 and 7, the flange 6 having a recessed centrally disposed disk 8 forming a hub portion 9 and the flange 7 having an open hub portion 10 of a diameter adapted to telescope over the hub 9 in friction-fitting engagement therewith and of a width to completely enclose the hub 9 as shown in Figure 2 of the drawings.

The disk 8 is formed with a central opening 11 for rotatably mounting the reel on a pin or shaft 12 carried by the bottom portion 13 of an annular container designated generally at 14.

As shown in Figures 2 and 6 of the drawings, the container is adapted to hold a plurality of the reels 5 freely mounted on the shaft 12 and enclosed therein by a cover or cap 15.

A flexible member, such as a coiled fishing leader 16 of conventional material, is placed on the hubs 9 and 10 of the assembled flanges of the reel and with the free end 17 of the leader extending outwardly through a transversely extending slot 18 in one side of the container 14.

A portion of the side wall of the container adjacent the opening 18 is pressed outwardly to form a protuberance 19 to which a resilient plate 20 is secured by rivets or the like 21, to the under side of one end of which is suitably secured a pad 22 of cork or other suitable material which overlies the opening 18, the tension of the plate 20 holding the free end 17 of the flexible member from accidental withdrawal and prevents the coil 16 from becoming tangled on the reel.

The other end of the plate 20 is formed with tapered beveled edges 23 to provide cutters by means of which a desired length of the flexible member 17 may be severed.

The individual reels 5 in the container 14 may hold different types of leaders coiled on the drums of the reels.

Figure 8:
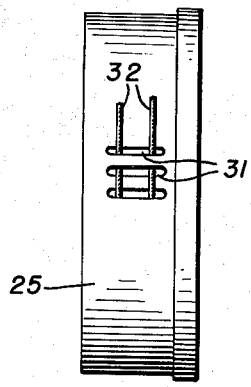
Figure 8 is an edge elevational view showing the holder for the end of the coil.
Figure 10:
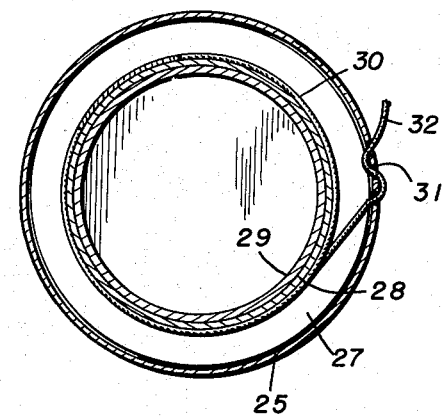
Figure 10 is a circumferential sectional view taken on a line 10—10 of Figure 9.
Figure 9:
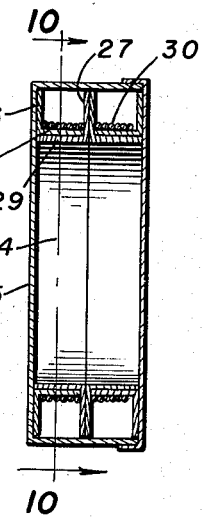
Figure 9 is a transverse sectional view taken on a line 9—9 of Figure 7.
Figure 11:
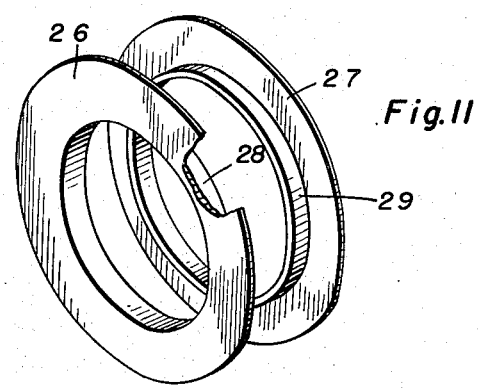
Figure 11 is a perspective view of one of the knock-down reels.

In the form of the invention illustrated in Figures 7 to 11, inclusive, a plurality of reels 24 are shown mounted in the annular container 25. Each of the reels 24 comprises a pair of opposed flanges 26 and 27 having hub portions 28 and 29 of different diameter for telescoping engagement one within the other, as shown more clearly in Figure 9 of the drawings.

The coiled fishing leaders 30 are mounted on the outermost hub 28 and the sections of the reel then assembled and placed in the container.

The side of the container 25 is formed with a plurality of spaced parallel transversely extending slots 31 through which the ends 32 of the leaders are laced to hold the loose ends thereof, In view of the foregoing description taken in junction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A dispensing device comprising a container adapted for holding a reel, said container having an opening through which the free end of a flexible member wound on the reel is withdrawn, a resilient elongated plate secured at its intermediate portion to the container to provide a first free end portion and a second free end portion, said first free end portion overlying the opening in clamping engagement with the free end of the flexible member to clamp the latter against the outer surface of the container, and said second free end portion of the plate being spaced from the surface of the container and having sharpened edges to form a cutting blade under which the free end of the flexible member is drawn to sever the latter by an upward pulling force subjected thereto, and said free end of the flexible member extending from the opening longitudinally over and against the top of said first free end portion of the plate toward the second free end portion of the plate and subjecting the first free end portion of the plate to a downward increased clamping force by the pulling force subjected to the free end of the flexible member.

ARTHUR CARL JOHNSON.

References Cited in the file of this patent

UNITED STATES PATENTS

| Number | Name | Date |
|---|---|---|
| 579,461 | Yeakel | Mar. 23, 1897 |
| 833,237 | Olson | Oct. 16, 1906 |
| 1,050,118 | Farrell | Jan. 14, 1913 |
| 2,058,536 | Waseen | Oct. 27, 1936 |
| 2,124,512 | Allen et al. | July 19, 1938 |
| 2,148,860 | Huber | Feb. 28, 1939 |
| 2,201,305 | Springer | May 21, 1940 |
| 2,268,547 | Haines | Jan. 6, 1942 |
| 2,437,888 | Narki | Mar. 16, 1948 |

FOREIGN PATENTS

| Number | Country | Date |
|---|---|---|
| 239,328 | Great Britain | Sept. 10, 1925 |